Nov. 17, 1959  D. SWEIGART  2,912,786
CUFF-APPLYING MECHANISM
Filed June 4, 1957 2 Sheets-Sheet 1
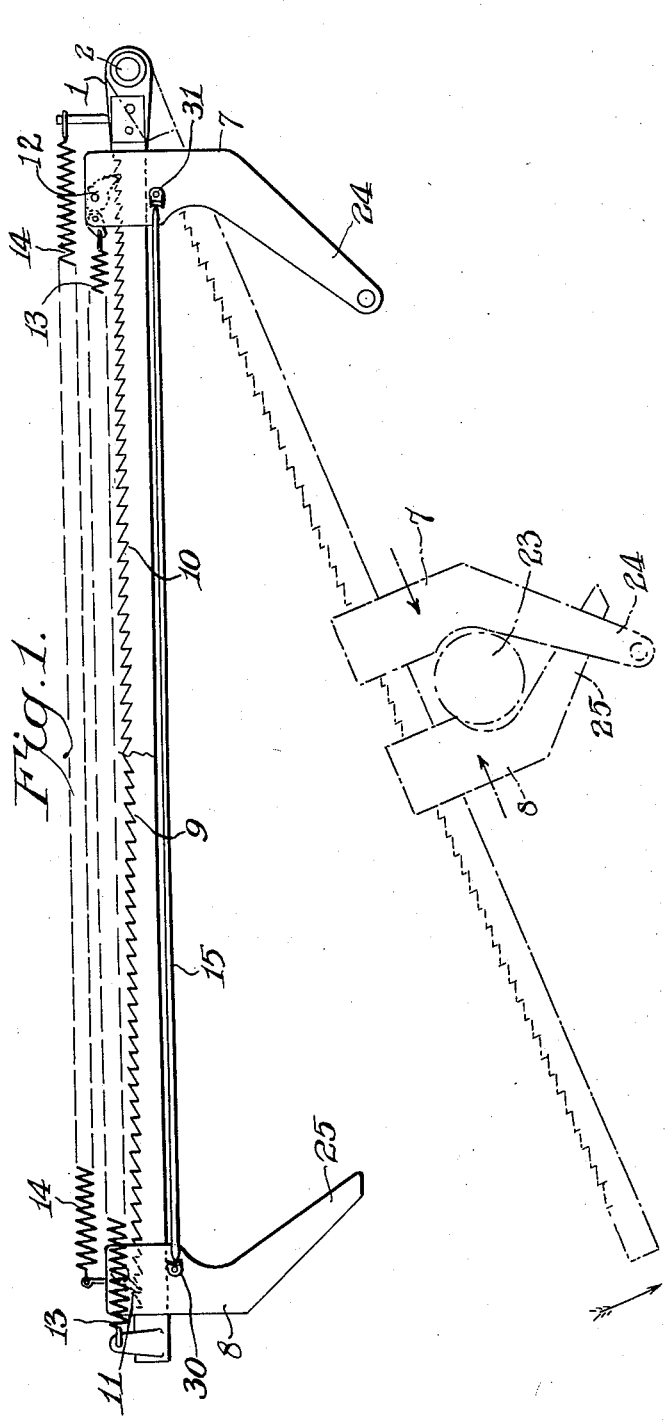
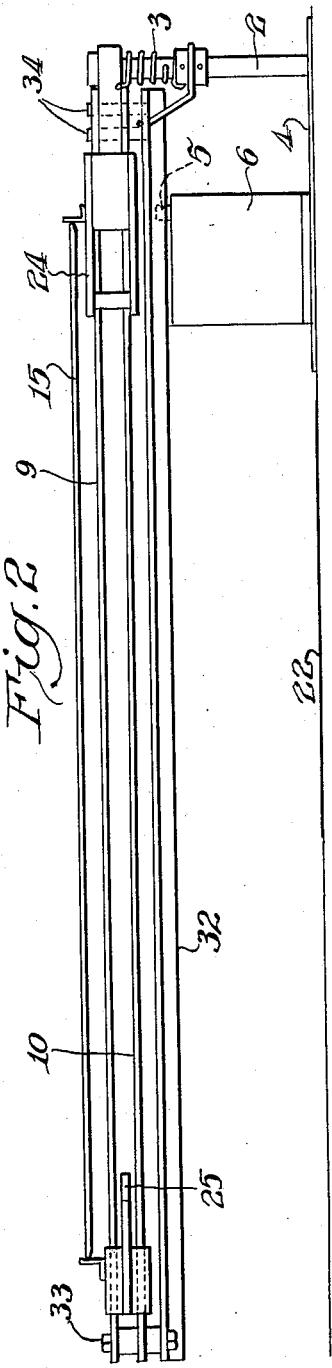
Inventor:
David Sweigart
David Sweigart

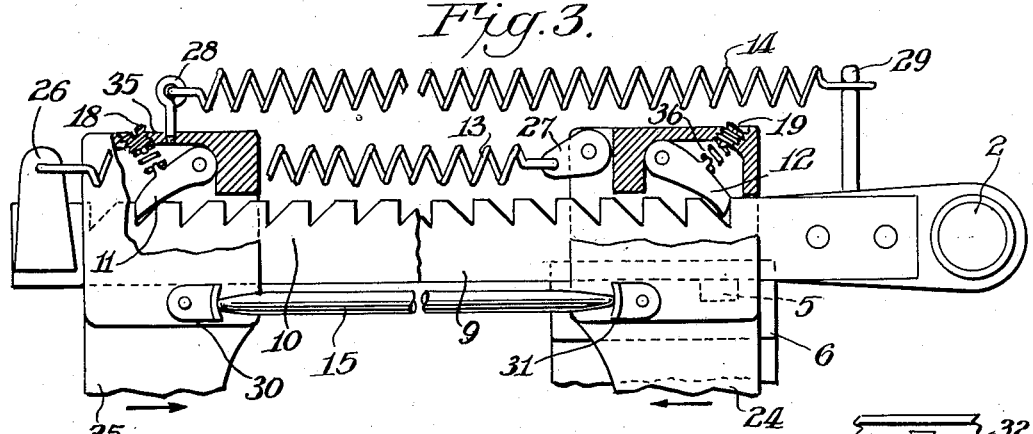
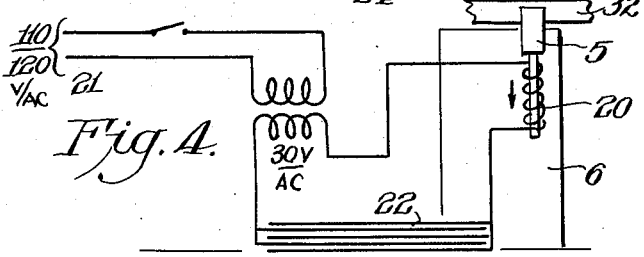
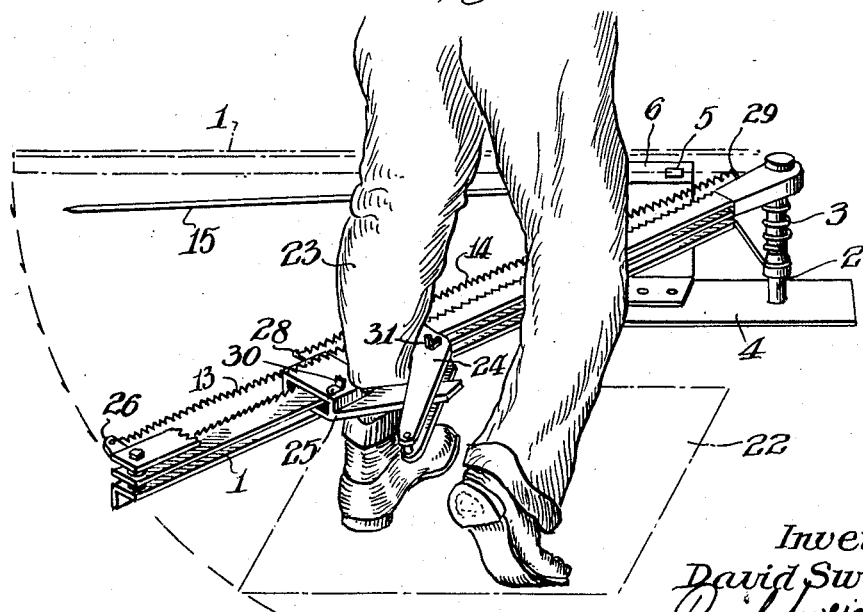

United States Patent Office 2,912,786
Patented Nov. 17, 1959

2,912,786
CUFF-APPLYING MECHANISM

David Sweigart, Wilmington, Del., assignor to Sweigart Protection Company, Inc., Wilmington, Del.

Application June 4, 1957, Serial No. 663,535

5 Claims. (Cl. 43—59)

This invention relates to burglar traps and mechanisms for capturing intruders, by applying one or more cuffs thereto, especially about the legs of the person who is captured.

There is a need for a device which can be used effectively for capturing human beings, when such capture is imperative for the protection of society, for example in prison breaks, burglaries, warfare, etc.

In accordance with this invention, a device is provided which mechanically applies a cuff about one or both legs of the person to be captured. This device is further illustrated by reference to the accompanying drawing.

As shown in the drawing the cuff is applied when the trap is sprung. The cuff is made up of members which are mounted on an upper and a lower rack arm respectively. Figure 1 is a top plan view of the device showing a portion of the upper rack arm removed to expose the lower rack arm, the broken lines illustrating the position of the rack arms and cuffs when the trap is sprung. Figure 2 is a side view showing respective positions of the cuff members before the trap is sprung. Figure 3 is also a top view showing sectional detail explained hereinafter. An electrical circuit for operation of the trap is shown in Figure 4. Figure 5 shows the trap in sprung position.

Figure 1, as stated above, represents a top view, and Figure 2 is a side view, of the mechanism, showing a bar 1, rotatably mounted on a post 2, which supports said bar. This bar is made up of an angle iron 32 and the racks 9 and 10 which are mounted on the angle iron through supporting elements 33 and 34 as shown. One end of the upper and lower rack arms swivels on the post 2, thus providing the support for the entire bar assembly. Cooperating with said bar and post is a helical spring 3 which is adapted to produce rotation of said bar. The rotation of the bar is blocked by the latch 5 of a lock release mechanism 6. On said bar two cuff members 7 and 8 are slidably mounted. The two parallel racks 9 and 10 of bar 1 are provided with ratchet teeth along one edge thereof as seen in Figure 1, each rack being engaged by a pawl 11 and 12, in each cuff member. The racks have oppositely pitched teeth. Helical springs 13 and 14, suspended between the supports 26, 27 and 28, 29 respectively, serve to draw together the cuff members. The cuff members are prevented from moving toward each other by a separating rod 15 positioned between the cuff members. Each extremity of the said rod is in contact with a vertical surface on rod-holding elements 30 and 31 supported by the cuff members 7 and 8 respectively.

The springs 13 and 14 are deleted from the background of Figure 2, it being understood that their position is as shown in Figure 1. The solenoid and latch 5, shown in Figure 2 have been omitted from Figure 1, in order to show the other parts more clearly.

Figure 3 is a detailed view showing the cooperation of the pawls 11 and 12 with the rows of ratchet teeth on racks 9 and 10. The screws 18 and 19 serve to limit the motion of the pawls 11 and 12 away from the ratchet teeth. If desired, the pawls may be actuated by springs 35, 36 interposed between the base of each screw and the corresponding pawl.

Figure 4 shows the operation of the electrical circuit which controls the release of the latch 5. The release mechanism is preferably of the type very commonly used for release by remote control of locks in the doors of buildings. The latch 5 of said mechanism is actuated by a solenoid 20 which is responsive to current from the current source 21, the circuit being closed by means of the signal mat 22 or other well known means. This signal mat is placed on the floor on which a base 4 for the post 2 is mounted, and under the path swept by the bar 1 as it rotates.

Figure 5 shows the functioning of the mechanism in applying a cuff to the leg of an intruding person 23. The closing of the circuit by the weight of the intruder on the signal mat 22 causes the solenoid 20 to actuate latch 5 to release the bar 1 for rotation and impact of the rod 15 against the leg of the intruder. This displaces the rod 15 and the cuff members move under the bias of springs 13 and 14 to encircle the leg. The cuff members have claw-like arms 24, 25, also positioned on the forward side of the bar 1 as it rotates. These claws form a cuff about the leg of the intruder. This can occur at any point along the bar 1.

It is to be understood that in many instances it will be desirable to employ two such devices close to each other and adapted to apply a cuff to each leg of the intruder. One may have a clockwise rotating bar and the other a counter-clockwise rotating bar.

In practice it is usually desirable to keep the mechanism concealed within a wall, under a safe or counter, or the like.

It is to be understood also that the electric circuit may simultaneously actuate other devices such as burglar alarms, cameras, and the like.

What is claimed is the following:

1. A device for immobilizing a human being, comprising a supporting post, an elongated bar member rotatably mounted on said post adjacent one end thereof, a spring member anchored at one end to said post and at its other end to said bar to bias said bar in one direction about said post, a pair of jaw members slidably mounted on said bar and adapted to move from an open set position to a closed position to clamp a portion of a body therebetween, means for moving said jaws from open set position to closed position, trigger means for holding said jaws in open set position and releasable upon striking said body portion, said bar member being provided with a series of ratchet teeth, each of said jaw members being provided with a pawl adapted to cooperate with said teeth for locking said jaw members about said body portion, lock means for releasably holding said bar member against the bias of said spring member, and means for releasing said lock means, whereby when said lock means is released said bar will rotate about said post until said trigger means strikes said body portion releasing said jaws for movement to a clamping position about said body portion.

2. The device of claim 1 in which the means for moving the jaws from open set position to closed position comprises a pair of coil springs, one of said springs having one end connected to one of said jaws and the other end connected to said bar, the other of said springs having one end connected to the other of said jaws and the other end connected to said bar.

3. The device of claim 1 in which the trigger means comprises a projection on each of said jaws and a rod adapted to have its ends abut said projections to hold said jaws in said set position and to be displaced from said projections when said rod strikes said body portion.

4. The device of claim 1 in which said bar member comprises a pair of spaced members, said ratchet teeth being connected to each of said spaced members, one of said pawls being adapted to cooperate with said teeth of one of said spaced members and the other of said pawls being adapted to cooperate with said teeth of the other of said spaced members, whereby the jaws may be locked in any position along said elongated bar.

5. In a device for immobilizing a human being, the combination of a supporting post, an elongated bar rotatably mounted adjacent one end thereof on said post, a spring member anchored at one end to said post and at its other end to said bar to bias said bar for rotation in one direction about said post, a pair of coacting jaw members provided on said bar, at least one of said jaw members being slidable on said bar from an open set position toward the other jaw member to a closed position for clamping a portion of a body between the jaw members, means for sliding said slidable jaw member from its open set position to the closed position, trigger means for holding the slidable jaw member in the open set position and releasable upon striking of said body portion, said bar member being provided with a set of ratchet teeth, said slidable jaw member being provided with a pawl adapted to cooperate with said teeth for locking the slidable jaw member in the closed position about said body portion, lock means for releasably holding said bar against the bias of said spring member, and means for releasing said lock means, whereby when said lock means is released said bar will rotate about said post until said trigger means strikes said body portion releasing said slidable jaw member for movement toward the other jaw member to a clamping position about said body portion.

References Cited in the file of this patent
UNITED STATES PATENTS

| | | |
|---|---|---|
| 1,177,448 | Rosko | Mar. 28, 1916 |
| 1,731,097 | Frailey | Oct. 8, 1929 |